Oct. 6, 1931.    J. F. LINCOLN    1,826,355
ARC WELDING
Filed Jan. 12, 1923    2 Sheets-Sheet 1
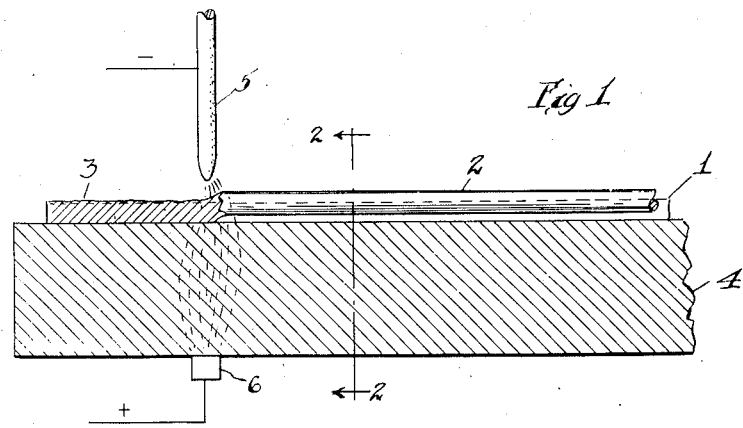
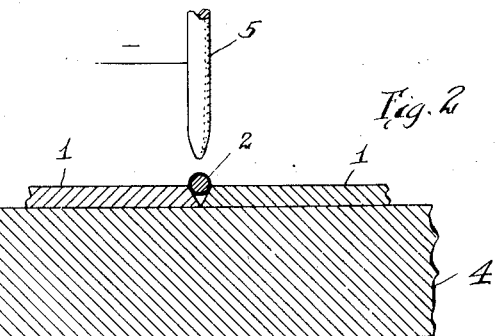
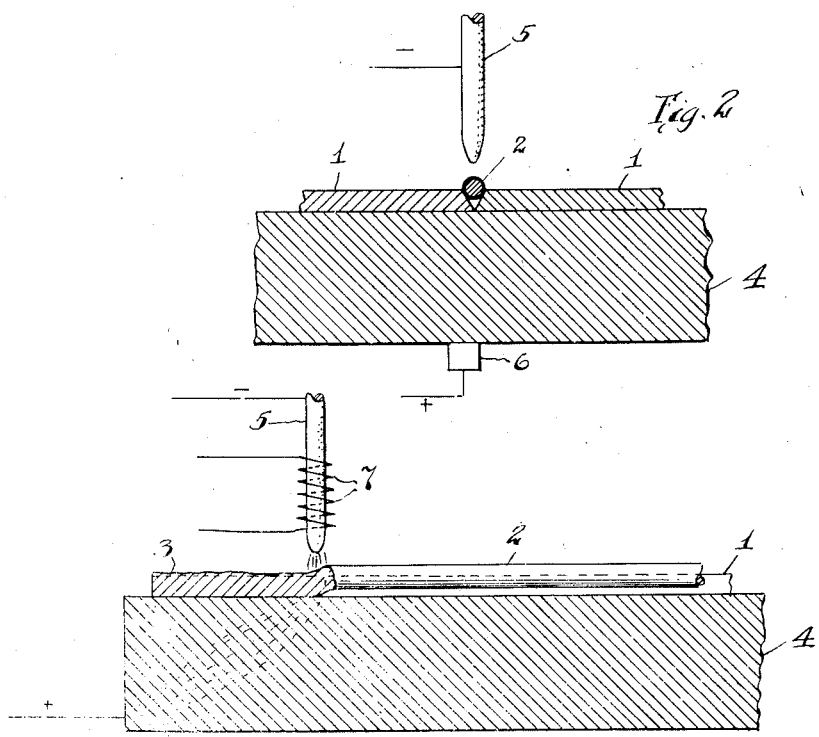
INVENTOR.
James F. Lincoln
BY
Fay, Oberlin & Fay
ATTORNEYS

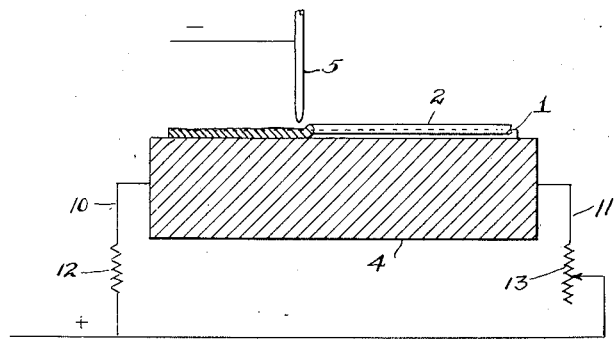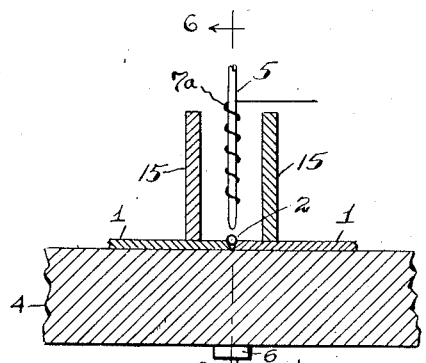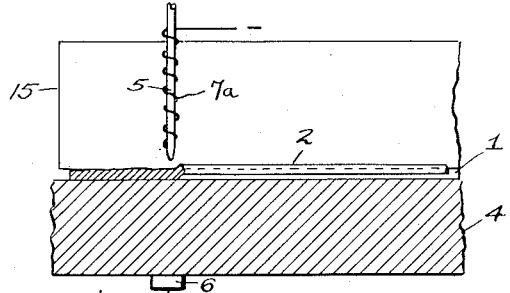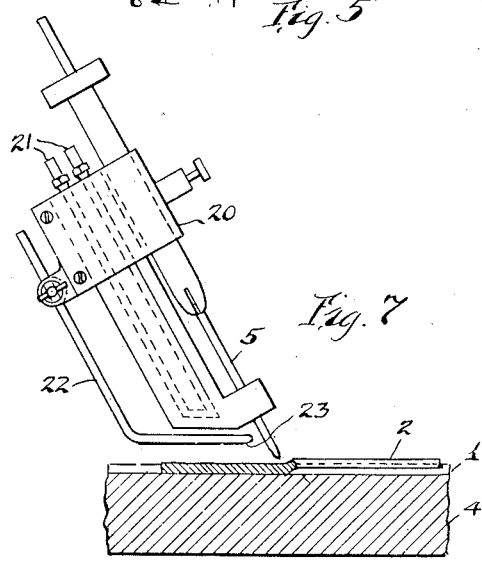

Patented Oct. 6, 1931

1,826,355

UNITED STATES PATENT OFFICE

JAMES F. LINCOLN, OF CLEVELAND, OHIO, ASSIGNOR TO THE LINCOLN ELECTRIC COMPANY, OF CLEVELAND, OHIO, A CORPORATION OF OHIO

ARC-WELDING

Application filed January 12, 1923. Serial No. 612,229.

The present improvements have more particular regard to methods of electric welding, and of working metal by electricity in general, wherein an electric arc is struck between the part or parts to be fused and a carbon electrode that is moved relatively to such parts so as to cause the arc to traverse the work. One principal object of the invention is to control the direction of "blow" of the arc so as to cause the same to incline in any desired direction from the end of the electrode, for example forwardly or rearwardly, or laterally to either side, having regard to the direction of travel of the electrode relatively to the work. A further object is to obtain a smooth, even action of the arc so as to produce a more nearly perfect weld.

This invention is related in its subject matter to my Patent No. 1,774,023 issued on August 26, 1930.

Where a filler strip or wire is disposed along a seam that is to be welded and a fluxing material is in addition utilized, particularly where such material is introduced in the form of a coating applied to such strip or rod, it is desirable to melt down such flux first of all, then such strip and finally the juxtaposed edges of the pieces of metal which are to be united. In such case, it will be desirable to have the arc blow forwardly. In other cases, however, it may be desirable to have the arc incline in the reverse direction, while in a case where the work slants transversely of the line of the weld, I have found it contributes to the perfection of the juncture obtained if the arc be blown against the incline, since thereby the tendency for the molten metal to run away may be overcome. It would appear, in other words, that the arc comprises a myriad of impinging particles, the action of which, if properly controlled, is to smooth out and retain in place the metal as it is rendered molten by the heat of such arc. At the same time the arc is prevented from jumping from one spot to another, or from becoming "wild", and partakes more of the character of a gas torch in the smoothness and quiet with which it works.

I have discovered several ways in which directional control of such arc may be successfully accomplished. In the first place, it appears that the arc will always blow away from the direction in which the most of the current comes through the work to point where the arc is struck, the work always being connected with the source of current supply on the positive, and the electrode on the negative side. Accordingly, I may control the action of the arc by varying the direction of flow of the incoming current. Another way that I have found effective for controlling the arc is to place alongside of and substantially parallel with the path of travel thereof two bars, preferably of metal, although any conductive material suitable for electrode use may be employed. Such bars, which may at the same time serve as clamps to hold the pieces of work in place, apparently divert or divide the magnetic flux in such a manner as to produce a field that has a remarkable quieting and steadying effect on the arc. Again, I have found that physical means, such as a jet of air, or other gaseous medium, may be employed positively to give direction to the arc. The use of such a jet, projected against the arc, has the further specific advantage that fluxing material may be introduced in powdered form with the jet, thereby insuring uniformity in the application of such material to the molten metal entering into the weld.

I am aware that it has been proposed heretofore to utilize electro-magnetic action to steady and concentrate an electric arc employed in working metal, e. g. as in welding together metal parts. Thus in the so-called Benardos process (see U. S. Patents Nos. 388,245 and 388,246) an arc is formed between the metal that is to be welded and a suitably held carbon electrode and simultaneously electro-magnetic force is exerted at the point where the welding takes place by applying an electro-magnet to that face of the plates opposite to the one on which the arc is formed. In the Zerener system an electro-magnet is likewise employed but in connection with two carbon pencils inclined so that the arc will be formed between the proximate ends of the latter. Such electro-magnet, as employed by Dr. Zerener (see Brit. Patent No. 20,170/1894), surmounts such carbon electrodes or pencils and its action simply is to direct the arc flame from the carbons until it assumes a form somewhat similar to a blow pipe flame and in this form may be directed onto the metals to be welded.

It does not seem, however, heretofore to have been realized in the utilization of the electric arc in metal working processes that where the article being worked, or the bed of conducting material upon which such article is ordinarily supported, is utilized to form a portion of the path traversed by the current in passing to the point opposite which the electrode is located, the flow of such current produces a magnetic field that may seriously influence the behavior of the arc. I have discovered that where the lines of force in such field are properly disposed, the tendency of the arc to lag or "stick", as well as the unsteadiness of the arc consequent upon its irregular shifting from one point to another on the work, may be largely, if not entirely, overcome. Supplementary to the foregoing method of control, I may also employ, if desired, an electro-magnet to create a special field, the lines of force of which will co-operate with those produced, as aforesaid, by the flow of the welding current through the work or bed upon which it is supported, or which may even counteract such last mentioned field, if not found practical to maintain same in proper relation to the work.

To the accomplishment of the foregoing and related ends, the invention, then, consists of the steps hereinafter fully described and particularly pointed out in the claims, the annexed drawings and the following description setting forth in detail one approved method of carrying out the invention, such disclosed mode, however, constituting but one of the various ways in which the principle of the invention may be used.

In said annexed drawings:—

Fig. 1 is a more or less diagrammatic representation of the manner in which a weld is formed where I control the electric arc simply by control of direction of flow of the current through the work or bed on which the work rests; Fig. 2 is a cross-section through the apparatus illustrated in Fig. 1, taken on the plane indicated by the line 2—2 thereon; Fig. 3 is a diagrammatic representation, similar to Fig. 1, of such operation where an electro-magnet is conjointly employed; Fig. 4 illustrates in a similar manner still another arrangement wherein the current flowing through the work is utilized to control the arc; Figs. 5 and 6 are respectively a cross-section and a longitudinal section of an apparatus wherein clamp-bars disposed alongside the seam supplement or themselves accomplish such control; and Fig. 7 is a side elevation of an electrode holder equipped with means for projecting a jet of air against the arc.

In the arrangement illustrated in the several figures of the drawings, the work is shown as consisting of two sheets 1, 1, which are disposed with the edges thereof, that are to be joined together, in substantially abutting relation. Sufficient space, however, is left between such edges, or ordinarily the latter are slightly beveled, so that a filler strip or wire 2 may be inserted therebetween. Such element 2 ordinarily will be of the same material, i. e. iron, as the metal of the sheets, but may, if desired, contain special alloying constituents, or even be of a different metal entirely, so far as the practice of the present invention is concerned. The object of the illustrated operation, it will be understood, is to melt down such element 2 and interfuse same with the edges so that the resultant seam 3, as shown at the left in Figs. 1 and 3, will be of substantially the same thickness as the sheets and of equal, if not greater, strength and ductility than the latter.

As shown, the sheets 1 with such strip 2 interposed therebetween are preferably supported on a bed or anvil 4 which will ordinarily be of copper or other heat conducting material, and in order to increase the cooling effect of such bed, it may be made hollow with suitable connections (not shown) for circulating water through its interior.

The welding, as previously indicated, is accomplished by means of an electric arc, a carbon electrode 5 being employed and the welding circuit including such carbon, the strip 2 and the bed or anvil 4. I consider it undesirable, where the sheets are of relatively light gauge, to connect the corresponding lead directly therewith, inasmuch as we have found that a sharp bend, i. e. one approaching a right angle, in the line of flow of the current through the work to the point where the arc is formed, is objectionable, unless its effect is in some way counteracted, creating, as it does, a magnetic field that has a very disturbing effect on the arc, or at least acts upon such arc in a manner contrary to that desired. Instead I bring the current to the point on the work opposite the electrode in a line that is as nearly direct or straight as possible and that does not incline to a perpendicular line passing through such point at an angle nearly as sharp as a right angle. Preferably such line of flow will be kept well within an angle of 45 degrees to such perpendicular line; furthermore, such line of flow where it does incline will preferably lie in a plane passing through such perpendicular line and the junction line or seam between the sheets 1. As a result of the foregoing disposition, the effect on the arc of the magnetic field produced by the flow of current through the bed and work will be substantially confined to the plane just defined and if the prescribed angular relation of the line of flow to the perpendicular is maintained, the lines of force of such field, instead of causing the arc to lag, will tend to "blow" the same ahead and thus melt down the filler strip or wire 2 and the flux utilized in connection therewith so as to obtain a uniformly perfect weld in the manner hereinbefore set forth.

From the foregoing it will be readily apparent that by means of a different disposition of leads, etc., the arc may be caused to "blow" in any desired direction.

Depending upon the length of the seam to be formed and the thickness of the bed 4, it may be necessary either to shift the work upon such bed or to shift the point at which the current from the outside lead is supplied to the bed. Where the latter course is followed, a movable contact 6 that travels in unison with the electrode 4 will provide such shifting connection with the bed.

Where it is not found practical to maintain the line of flow of the current through the work to a point opposite the arc, in such manner as to fully obtain the result sought, viz., the inclination or blowing of the arc forwardly in the direction in which it travels along the work, I employ, as shown in Fig. 3, an electro-magnet 7, preferably consisting of a coil surrounding the electrode 5 through which the welding current is passed on its way to such electrode, as specifically illustrated in Figs. 5 and 6. The lines of force of the resultant field will then be such as to incline or direct the arc in the desired manner, providing the coil is located closely adjacent to the operative end of the electrode from which the arc springs. The magnetic field thus created may be utilized either to supplement the one naturally produced by the flow of current through the work, or to counteract the latter where it is impossible to maintain the line of flow as prescribed. From 200 to 300 ampere-turns, with any usual welding current, will be found sufficient for such electro-magnet 7, the direction of the flux created by the magnet being the same as the direction of flow of the welding current through the electrode.

In the arrangement shown in Fig. 4, the lead to the bed 4 is divided into two branches 10 and 11, respectively connected with opposite ends of such bed. A fixed resistance 12 in the first branch, combined with a variable resistance 13 in the second, renders it possible to cause the current flow through the bed to the welding point in the work to preponderate in either direction as desired, despite the fact such point shifts as the electrode travels along the work.

The arrangement shown in Figs. 5 and 6 is substantially the same as in the preceding figures except for the addition of two bars 15, 15, that are laid on the work, one on each side of the joint to be welded. So far as these Figs. 5 and 6 afford inclusive illustration of the several means hereinbefore described for controlling the blow of the arc, the coil 7a (corresponding with coil 7 of Fig. 3) is shown as connected in series with the electrode 5, so that the current will pass through the coil on its way to such electrode in the preferred manner indicated above; while the movable lead for supplying current to the work is exactly as shown in Fig. 1. Referring then to the added feature consisting of bars 15, these bars may be of such weight in themselves, or such additional pressure may be applied thereto, as to cause them to clamp the edges of the sheets that form the work firmly upon the bed 4, and as previously explained, they will be of metal or equivalent conductive material. The action of such bars when thus disposed parallel with the seam, one on each side of the path of travel of the arc, has already been sufficiently explained. However, special note should be made of the fact that due to the location of these bars in close proximity to the path of travel of the electrode, any tendency on the part of the arc to wander laterally will be effectually overcome. In other words, the material of the bars being of metal, the arc once struck, preferentially stays by the pool of molten metal or crater thereby formed in the work, and as the electrode is moved along the line of the weld and the arc becomes attenuated, it will more readily follow such line, where the latter is guarded, so to speak, on either side by a bar of the character described. The latter being of metal and of relatively considerable mass, as shown in cross-section in Fig. 5, is not apt to become heated, even in the proximity of the arc, to the degree that the portion of the filler strip just forward of the arc and the adjacent edge portions of sheets 1 do. Accordingly the arc is constrained to move in the desired direction instead of jumping to one side or the other.

Finally, in Fig. 7 there is shown in somewhat greater detail than in preceding figures a holder 20 of special design for the electrode 5, such electrode being characterized among other things by having connections 21 for circulating a cooling liquid through the body thereof. The feature of present interest, however, is a tube 22 adjustably attached to said holder and terminating in a jet, through which air or an equivalent gaseous medium may be directed against the arc, immediately in the rear thereof. As a result such arc may be positively blown to assume desired forwardly or otherwise inclined position. As previously noted, if desired, a suitable fluxing material in powdered form may be supplied along with such jet of air by being fed into the tube 22. In this way, the application of the flux to the joint is accomplished in a very uniform manner and without waste of flux, an unusually clean and perfect weld resulting.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of electric arc welding which comprises adjustably controlling the angular relation of the arc to the work by directing a line of current flow through the work or its support from a point adjustably movable with respect to the electrode.

2. The method of electric arc welding which comprises adjustably controlling the angular relation of the arc to the work by maintaining constant the angular relation between the line of current flow through the work or its support, and the axis of the electrode at appreciably less than a straight angle to create a resultant magnetic field adapted to bear laterally on the arc.

3. In arc welding mechanism, the combination of a welding electrode adapted to be presented in arcing relation to the work and moved relatively thereto along the line to be welded, a conductor for welding current having contact with the work or its support, means for maintaining the arc in a predetermined angular relation to the work, and a bar of metal disposed alongside the path of travel of the arc, said bar having such a degree of heat conductivity and extending away from the work in such close proximity to such arc as to restrain the tendency of such arc to wander to the corresponding side of such line of travel.

4. In arc welding mechanism, the combination of a welding electrode adapted to be presented in arcing relation to the work and moved relatively thereto along the line to be welded, a conductor for welding current having contact with the work or its support, means for maintaining the arc in a predetermined angular relation to the work, and a bar of metal disposed on each side of the path of travel of the arc, said bars having such a degree of heat conductivity and extending away from the work in such close proximity to such arc as to restrain the tendency of such arc to wander to either side of such line.

5. In arc welding mechanism, the combination of a welding electrode adapted to be presented in arcing relation to the work and moved relatively thereto along the line to be welded, a conductor for welding current having contact with the work or its support and adjustable relative to said electrode, and a bar of metal disposed on each side of the path of travel of the arc, said bars having such a degree of heat conductivity and extending away from the work in such close proximity to such arc as to restrain the tendency of such arc to wander to either side of such line.

6. In arc welding mechanism, the combination of a welding electrode adapted to be presented in arcing relation to the work and moved relatively thereto along the line to be welded, a conductor for welding current having contact with the work or its support and adjustable relative to said electrode, and a helical coil for electric current around said electrode.

7. In arc welding mechanism, the combination of a welding electrode adapted to be presented in arcing relation to the work and moved relatively thereto along the line to be welded, a conductor for welding current having contact with the work or its support and adjustable relative to said electrode, a helical coil for electric current around said electrode, a bar of metal disposed on each side of the path of travel of the arc, said bars having such a degree of heat conductivity and extending away from the work in such close proximity to such arc as to restrain the tendency of such arc to wander to either side of such line.

8. In arc welding mechanism, the combination of a welding electrode adapted to be presented in arcing relation to the work and movable relatively thereto along the line to be welded, a conductor for welding current fixed relative to said electrode and movable relative to the work and contacting therewith or its support, and a bar of metal disposed on each side of the path of travel of the arc, said bars having such a degree of heat conductivity and extending away from the work in such close proximity to such arc as to restrain the tendency of such arc to wander to either side of such line.

9. In arc welding mechanism, the combination of a welding electrode adapted to be presented in arcing relation to the work and movable relatively thereto along the line to be welded, a conductor for welding current fixed relative to said electrode and movable relative to the work and contacting therewith or its support, a bar of metal disposed on each side of the path of travel of the arc, said bars having such a degree of heat conductivity and extending away from the work in such close proximity to such arc as to restrain the tendency of such arc to wander to either side of such line, and a helical coil for electric current around said electrode.

Signed by me this 10th day of January, 1923.

JAMES F. LINCOLN.